(12) United States Patent
Nishikawa

(10) Patent No.: US 12,684,246 B2
(45) Date of Patent: Jul. 14, 2026

(54) IMAGING APPARATUS USING COMMON REGIONS BETWEEN IMAGES FOR LUMINANCE COMPENSATION

(71) Applicant: DENSO CORPORATION, Kariya-city (JP)

(72) Inventor: Masato Nishikawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 55 days.

(21) Appl. No.: 18/430,509

(22) Filed: Feb. 1, 2024

(65) Prior Publication Data

US 2024/0267631 A1 Aug. 8, 2024

(30) Foreign Application Priority Data

Feb. 3, 2023 (JP) ................................. 2023-015588

(51) Int. Cl.
| | |
|---|---|
| *H04N 23/73* | (2023.01) |
| *B60R 1/24* | (2022.01) |
| *B60W 40/02* | (2006.01) |
| *G03B 11/04* | (2021.01) |
| *G06V 20/56* | (2022.01) |
| *H04N 23/71* | (2023.01) |
| *H04N 23/84* | (2023.01) |
| *G03B 9/02* | (2021.01) |

(52) U.S. Cl.
CPC .............. *H04N 23/73* (2023.01); *B60R 1/24* (2022.01); *B60W 40/02* (2013.01); *G03B 11/045* (2013.01); *H04N 23/71* (2023.01); *H04N 23/84* (2023.01); *B60R 2300/303* (2013.01); *B60W 2555/20* (2020.02); *G03B 9/02* (2013.01)

(58) Field of Classification Search
CPC ........ H04N 23/73; H04N 23/71; H04N 23/84; H04N 1/6052; H04N 23/76; B60R 1/24; B60R 2300/303; B60W 40/02; B60W 2555/20; G03B 11/045; G03B 9/02; G06V 20/56
See application file for complete search history.

(56) References Cited

U.S. PATENT DOCUMENTS

| | | | | |
|---|---|---|---|---|
| 7,619,668 B2 * | 11/2009 | Saka | ...................... | G03B 43/00 |
| | | | | 348/125 |
| 8,553,088 B2 * | 10/2013 | Stein | .................... | B60Q 1/1423 |
| | | | | 382/104 |
| 8,786,697 B2 * | 7/2014 | Kawasaki | ............ | G06V 20/584 |
| | | | | 348/148 |
| 2021/0073971 A1 | 3/2021 | Yokota | | |

FOREIGN PATENT DOCUMENTS

JP 2019145021 A 8/2019

* cited by examiner

*Primary Examiner* — Ahmed A Berhan
(74) *Attorney, Agent, or Firm* — Precision Patents, P.C.

(57) ABSTRACT

In an imaging apparatus, a common region identifier identifies a common region of each of a first image captured by a front monitor camera and a second image captured by a surrounding monitor camera. A difference calculator calculates a target luminance difference between the common region of the first image and the common region of the second image. A luminance adjuster performs, based on the target luminance difference, at least one of (i) a first adjustment of adjusting a luminance of the first image and (ii) a second adjustment of adjusting the at least one imaging parameter of the front monitor camera.

10 Claims, 8 Drawing Sheets

FIRST IMAGE I1

SECOND IMAGE I2

FIG.8

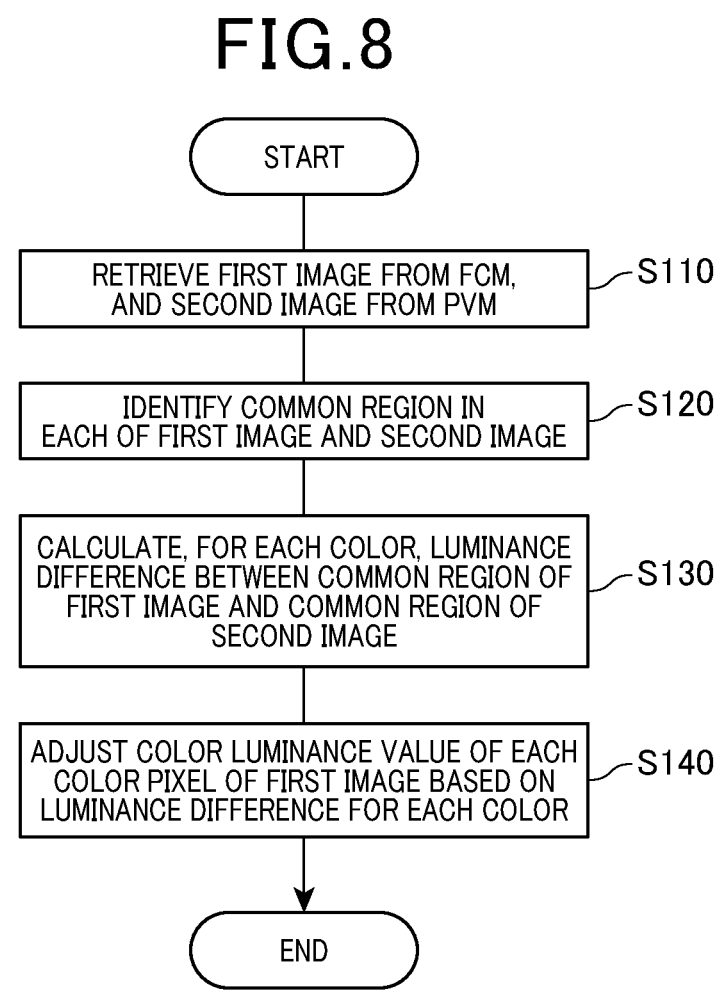

START

RETRIEVE FIRST IMAGE FROM FCM, AND SECOND IMAGE FROM PVM — S110

IDENTIFY COMMON REGION IN EACH OF FIRST IMAGE AND SECOND IMAGE — S120

CALCULATE, FOR EACH COLOR, LUMINANCE DIFFERENCE BETWEEN COMMON REGION OF FIRST IMAGE AND COMMON REGION OF SECOND IMAGE — S130

ADJUST COLOR LUMINANCE VALUE OF EACH COLOR PIXEL OF FIRST IMAGE BASED ON LUMINANCE DIFFERENCE FOR EACH COLOR — S140

END

IMAGING APPARATUS USING COMMON REGIONS BETWEEN IMAGES FOR LUMINANCE COMPENSATION

CROSS REFERENCE TO RELATED APPLICATION

This application is based on and claims the benefit of priority from Japanese Patent Application No. 2023-015588 filed on Feb. 3, 2023, the disclosure of which is incorporated in its entirety herein by reference.

TECHNICAL FIELD

The present disclosure relates to imaging apparatuses installable in a vehicle.

BACKGROUND

An imaging apparatus disclosed in Japanese Patent Application Publication No. 2019-145021 includes a front monitor camera and a control unit. The front monitor camera is disposed inside a vehicle, and captures images of a region in front of the vehicle. The control unit corrects the images captured by the front monitor camera.

Specifically, there may be a case where redundant light reflected from a dashboard, i.e., an instrument panel, inside the vehicle is incident on a region in an image captured by the front monitor camera, resulting in an excessive increase in the luminance of the region in the captured image. In this case, the control unit performs, based on an illuminance level measured by an illuminance sensor mounted to the dashboard, a correction task of reducing the luminance of the region in the captured image. The image corrected by the control unit can be used for image recognition of objects located around the vehicle.

SUMMARY

An aspect of the present disclosure provides an imaging apparatus. In the imaging apparatus, a common region identifier identifies a common region of each of a first image captured by a front monitor camera and a second image captured by a surrounding monitor camera. A difference calculator calculates a target luminance difference between the common region of the first image and the common region of the second image. A luminance adjuster performs, based on the target luminance difference, at least one of (i) a first adjustment of adjusting a luminance of the first image and (ii) a second adjustment of adjusting at least one imaging parameter of the front monitor camera.

BRIEF DESCRIPTION OF THE DRAWINGS

Other aspects of the present disclosure will become apparent from the following description of embodiments with reference to the accompanying drawings in which:

FIG. 8 is a flowchart schematically illustrating an example of a control routine carried out by an imaging apparatus according to the second embodiment;

DETAILED DESCRIPTION OF EMBODIMENT

Figure 1:
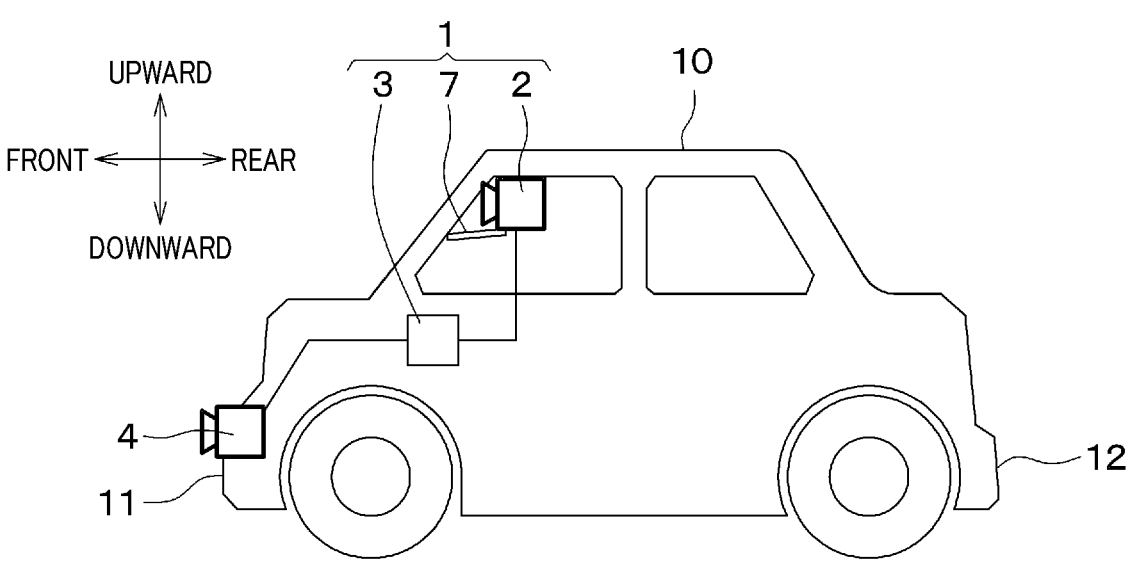
FIG. 1 is a schematic view illustrating a vehicle in which an imaging apparatus according to the first embodiment is installed.

Such an illuminance sensor is typically mounted to the dashboard inside a vehicle while being directed in an upward direction. This arrangement of the illuminance sensor inside the vehicle results in the illuminance sensor measuring a substantially same illuminance level if either an external light source outside the vehicle, such as the sun, is located diagonally above in front of the vehicle or diagonally above to the rear of the vehicle.

In contrast, such a front monitor camera is so disposed inside the vehicle as to receive light incident from the front of the vehicle. This arrangement of the front monitor camera may cause the front monitor camera to receive, in addition to measurement light incident from the front of the vehicle, redundant light; the redundant light may result in reflection of additional light of an external light source by one or more components located around the front monitor camera, such as the dashboard and/or a hood for covering the front monitor camera.

The amount of the redundant light to be received by the front monitor camera may depend on the position of the external light source relative to the vehicle. For this reason, even for the usage of the illuminance level measured by the illuminance sensor, it may be difficult to accurately ascertain influence, i.e., redundant-light influence, which is caused by one or more components located around the front monitor camera, on images captured by the front monitor camera.

Additionally, light received by the illuminance sensor passes through the front windshield of the vehicle, so that the illuminance level measured by the illuminance sensor may be subjected to influence from the transmission characteristics and/or fogging of the front windshield. Similarly, light received by the front monitor camera passes through the front windshield of the vehicle, so that images captured by the front monitor camera may be subjected to influence from the transmission characteristics and/or fogging of the front windshield.

The above disclosure of the patent publication may therefore make it difficult to accurately ascertain influence, which is caused by one or more peripheral components located around the front monitor camera, such as a dashboard, a hood for covering the front monitor camera, and/or the front windshield, on images captured by the front monitor camera.

In view of the circumstances set forth above, an exemplary aspect of the present disclosure seeks to provide plural technical measures, one of which is capable of reducing influence on images captured by a front monitor camera due to one or more peripheral components located around the front monitor camera. Another one of the plural technical measures is to determine one or more parameters specifically representing influence on images captured by the front monitor camera due to the one or more peripheral components located around the front monitor camera.

A first technical measure included in the plural technical measures is an imaging apparatus to be installed in a vehicle including a compartment, a front windshield, and a surrounding monitor camera having a surrounding field of view of the vehicle. The surrounding monitor camera is located outside the compartment of the vehicle. The imaging apparatus includes a front monitor camera having a front field of view for capturing, through the front windshield, a first image of the front field of view using at least one imaging parameter. The front field of view at least partly overlaps the surrounding field of view of the surrounding monitor camera so that an overlapped region between the front field of view and the surrounding field of view is defined as a common region of each of the first image and a second image captured by the surrounding monitor camera. The imaging apparatus includes a common region identifier configured to identify the common region of each of the first and second images. The imaging apparatus includes a difference calculator configured to calculate a target luminance difference between the common region of the first image and the common region of the second image. The imaging apparatus includes a luminance adjuster configured to perform, based on the target luminance difference, at least one of (i) a first adjustment of adjusting a luminance of the first image and (ii) a second adjustment of adjusting the at least one imaging parameter of the front monitor camera.

The imaging apparatus of the first technical measure is configured such that (i) the front field of view of the front monitor camera includes at least part of the surrounding field of view of the surrounding monitor camera, and the surrounding monitor camera is so located outside the compartment of the vehicle as to have no influence from peripheral components, such as a hood, a dashboard, and the front windshield, located around the front monitor camera.

Calculating, as the target luminance difference, the luminance difference between the common region of the first image captured by the front monitor camera and the common region of the second image captured by the surrounding monitor camera therefore enables an influence of the peripheral components exerted upon the first image to be determined. Accordingly, performing, based on the calculated target luminance difference, at least one of (i) the first adjustment of adjusting the luminance of the first image and (ii) the second adjustment of adjusting the at least one imaging parameter of the front monitor camera enables the imaging apparatus to obtain the first image having a reduced influence from the peripheral components around the front monitor camera.

A second technical measure included in the plural technical measures is an imaging apparatus to be installed in a vehicle including a compartment, a front windshield, and a surrounding monitor camera having a surrounding field of view of the vehicle. The surrounding monitor camera is located outside the compartment of the vehicle. The imaging apparatus includes a front monitor camera having a front field of view for capturing, through the front windshield, a first image of the front field of view. The front field of view at least partly overlaps the surrounding field of view of the surrounding monitor camera so that an overlapped region between the front field of view and the surrounding field of view is defined as a common region of each of the first image and a second image captured by the surrounding monitor camera. The imaging apparatus includes a common region identifier configured to identify the common region of each of the first and second images. The imaging apparatus includes a fogging determiner configured to determine whether an amount of blurring in the common region of the first image is greater than a predetermined first determination criterion, and determine whether an amount of blurring in the common region of the second image is smaller than or equal to a predetermined second determination criterion. The fogging determiner is additionally configured to determine that there is fogging of the front windshield in response to determination that (i) the amount of blurring in the common region of the first image is greater than the predetermined first determination criterion, and (ii) the amount of blurring in the common region of the second image is smaller than or equal to the predetermined second determination criterion.

That is, the first image captured by the front monitor camera may be subjected to an influence of fogging of the front windshield whereas the second image captured by the surrounding monitor camera may be free from the influence of the fogging of the front windshield.

In view of this point, determining that the amount of blurring in the common region of the first image is greater than or equal to the predetermined first determination criterion and the amount of blurring in the common region of the second image is smaller than or equal to the predetermined second determination criterion makes it possible to determine that there is fogging of the front windshield. Note that blurring of an image may include a blurred outline of at least one object appearing in the image, and/or reduced luminance edges in the image.

The following describes exemplary embodiments of the present disclosure with reference to accompanying drawings. In the exemplary embodiments and their modifications, descriptions of like or equivalent parts, to each of which an identical or similar reference character is assigned, are omitted or simplified to avoid redundant description.

First Embodiment

The following describes the first embodiment of the present disclosure with reference to FIGS. 1 to 7.

An imaging apparatus 1 according to the first embodiment is, as illustrated in FIG. 1, installed in a vehicle 10, and includes, for example, a front monitor camera, i.e., front monitor camera module (FCM), 2, a hood 7, and a control unit 3. Note that the front direction, rear direction, and the upward/downward direction (vertical direction), which are illustrated by respective arrows in FIG. 1, show the front direction of the vehicle 10, the rear direction of the vehicle 10, and the upward/downward direction, i.e., height direction, of the vehicle 10, respectively.

The vehicle 10, in which the imaging apparatus 1 of the first embodiment is installed, includes a plurality of surrounding-view monitor cameras 4 mounted thereto. Each of the surrounding-view monitor cameras 4 is mounted to a corresponding one of components located outside a compartment of the vehicle 10, which include a front bumper 11, a rear bumper, and unillustrated side mirrors. Each of the surrounding-view monitor cameras 4 is configured to capture an image of a corresponding surrounding view of the vehicle 10. The control unit 3 can combine the images captured by the respective surrounding-view monitor cameras 4 with one another to accordingly generate a panorama view image showing all surroundings of the vehicle 10. For this reason, the surrounding-view monitor cameras will also be referred to as panorama (panoramic) view monitor (PVM) cameras.

As an example of the surrounding-view monitor cameras 4, a surrounding-view monitor camera 4 has a predetermined front field of view in front of the vehicle 10 for capturing images of the front field of view is only illustrated in FIG. 1. The surrounding-view monitor camera 4 for capturing images of the front field of view in front of the vehicle 10 will be referred to as a front surrounding-view monitor camera 4. The front surrounding-view monitor camera 4 is for example mounted to the front bumper 11 or a front grill of the vehicle 10 while a lens of the front surrounding-view monitor camera 4 is directed to a forward direction of the vehicle 10.

Figure 2:
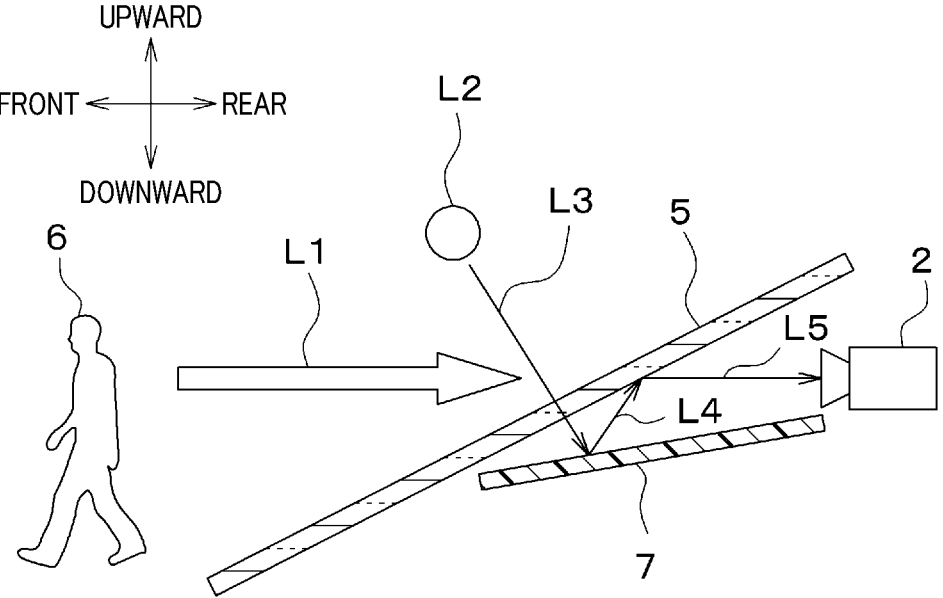
FIG. 2 is a view schematically illustrating an example of an arrangement of a front monitor camera of the imaging apparatus.

The front monitor camera 2 has a lens described later, and is, as illustrated in FIGS. 1 and 2, mounted to, for example, an inner surface of the roof of the vehicle 10 while the lens of the front monitor camera 2 is directed to the front direction of the vehicle 10. That is, the front monitor camera 2 has a predetermined front field of view in front of the vehicle 10.

As illustrated by arrow L1 of FIG. 2, light from the front field of view in front of the vehicle 10 is incident on the front monitor camera 2 through the front windshield 5. This enables the front monitor camera 2 to capture the front field of view in front of the vehicle 10 through the front windshield 5. FIG. 2 for example illustrates a pedestrian 6 existing in front of the vehicle 10, and the front monitor camera 2 captures an image of the front field of view including the pedestrian 6 as a target.

FIG. 1 illustrates that the front monitor camera 2 and the front surrounding-view monitor camera 4 are each directed to the front direction of the vehicle 10. In particular, the front field of view of the front monitor camera 2 includes at least part of the front field of view of the front surrounding-view monitor camera 4.

The front field of view of the front monitor camera 2 will be referred to as a main front field of view, and the front field of view of the front surrounding-view monitor camera 4 will be referred to as an additional front field of view.

That is, the front monitor camera 2 is configured to capture, from the inside of the vehicle 10, images of the main front field of view through the front windshield 5; the main front field of view includes at least part of the additional front field of view of the front surrounding-view monitor camera 4.

A hood 7 is, as illustrated in FIG. 2, arranged below the front monitor camera 2 in the vertical direction. The food 7 constitutes one of peripheral components located around the front monitor camera 2.

The hood 7 is configured as a substantially plate-like light shielding member extending in the width direction of the vehicle 10 and the front-rear direction, i.e., the longitudinal direction, of the vehicle 10. The hood 7 is arranged to block light, which has been emitted from an unillustrated light source inside the vehicle 10, such as a smartphone, and thereafter reflected by the front windshield 5, from entering the lens of the front monitor camera 2. This prevents the unillustrated light source inside the vehicle 10 from appearing in images captured by the front monitor camera 2.

As illustrated in FIG. 2, when an external light source L2 outside the vehicle 10, such as the sun, is located diagonally above in front of the vehicle 10, a flux of light (see arrow L3) emitted from the external light source L2 may enter the inside of the vehicle 10 through the front windshield 5. The entered flux of light L3 may be reflected by the food 4 as a reflected flux of light (see arrow L4), and the reflected flux of light L4 may be reflected by the front windshield 5 as a reflected flux of light (see arrow L5), and thereafter the reflected flux of light L5 may be incident on the front monitor camera 2. This situation may result in flared highlights in an image captured by the front monitor camera 2. Such flared highlights or blown-out highlights mean extreme luminance in a captured image. In other words, the flared highlights represent an extra increase in pixel values of the whole of an image captured by an image sensor within a given dynamic range of the image sensor.

From this viewpoint, the imaging apparatus 1 of the first embodiment aims to obtain images having lower flared highlights.

Figure 3:
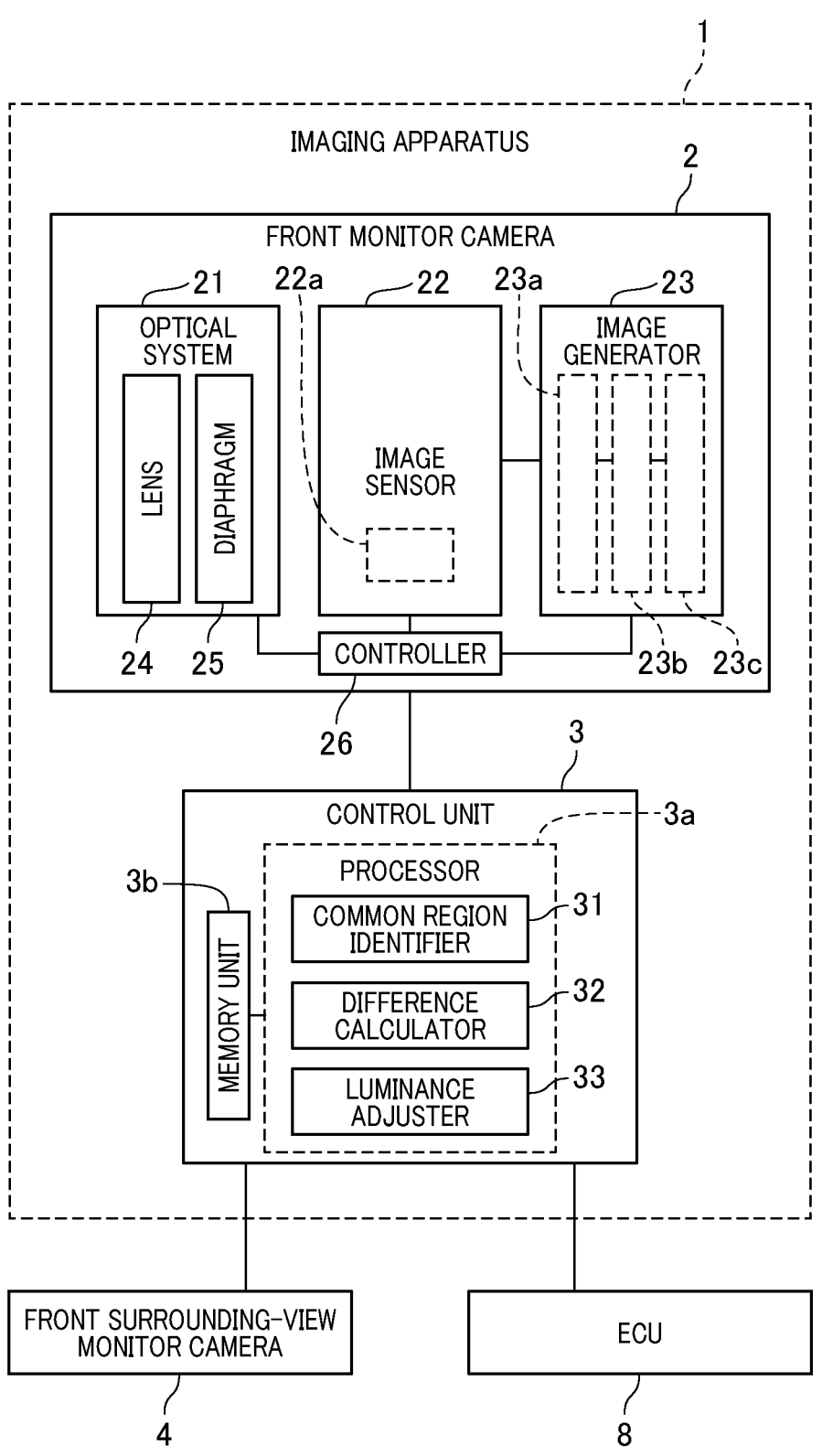
FIG. 3 is a block diagram schematically illustrating an example of a circuit and/or functional structure of the imaging apparatus illustrated in FIG. 1.

The front monitor camera 2 for example includes, as illustrated in FIG. 3, an optical system 21, an image sensor 22, an image generator 23, and a controller 26.

The optical system 21 includes a lens 24 and a diaphragm 25. The lens 24 receives light incident thereon from the main front field of view of the front monitor camera 2, and focuses the received light on the image sensor 22. The diaphragm 25 is connected to the controller 26, and is configured to control the amount of light passing through the lens 24 by an adjusted aperture value instructed by the controller 26.

The image sensor 22 is a Charge Coupled Device (CCD) sensor or a Complementary Metal-Oxide-Semiconductor (CMOS) sensor. The image sensor 22 is comprised of a plurality of light-sensitive elements, such as photodiodes, which respectively correspond to a plurality of pixels, two-dimensionally arranged in both the vertical direction and the vehicle-width, i.e., horizontal, direction of the vehicle 10. The two-dimensionally arranged pixels constitute a two-dimensional light receiving surface of the image sensor 22.

The image sensor 22 includes, for example, an electronic shutter 22a comprised of a transistor circuit for each light-sensitive element of the image sensor 22. The electronic shutter 22a for each light-sensitive element of the image sensor 22 controls, under control of the controller 26, an exposure time, i.e., a shutter time or a shutter speed, of the corresponding light-sensitive element of the image sensor 22.

Each light-sensitive element of the image sensor 22 has a predetermined upper limit and a predetermined lower limit of light intensity that can be received thereby.

Specifically, the image sensor 22 is configured such that, when light whose intensity level is within the lower and upper limits is incident on each light-sensitive element of the two-dimensional light receiving surface through the lens 24, the corresponding light-sensitive element receives the incident light during the exposure time, i.e., the shutter time, adjusted by the corresponding electronic shutter 22a, so that each of the light-sensitive elements outputs an electrical signal indicative of the intensity or quantity of the incident light. The electrical signals, i.e., pixel signals, outputted from the respective light-sensitive elements of the image sensor 22 constitute an image.

That is, the image sensor 22 is configured to cyclically capture a two-dimensional image, i.e., a frame image, of the additional front field of view thereof at a predetermine frame rate, in accordance with the exposure time adjusted for each frame image to be captured. In place of the electronic shutter 22a, a mechanical shutter for controlling the exposure time, i.e., the shutter time, of each light-sensitive element of the image sensor 22 may be used.

More specifically a frame image captured by the image sensor 22 can be a color frame image comprised of color pixels, i.e., red, green, and blue (RGB) pixels; each of the color pixels, i.e., the RGB pixels, is comprised of a color luminance value of, i.e., color luminance information on, at least one of predetermined colors, such as at least one of red, green, and blue.

The image sensor 22 is additionally configured to output, to the image obtainer 23, a captured frame image.

The image generator 23 includes an amplifier 23a, an analog-to-digital (A/D) converter 23b, and a composite-image generator 23c.

The amplifier 23a is configured to amplify the luminance values of the respective color pixels of the captured frame image by a predetermined gain.

The A/D converter 23b is configured to convert the luminance values of the respective color pixels of the captured frame image amplified by the amplifier 23a into digital luminance values in accordance with a predetermined bit width, i.e., the number of bits, thus obtaining a digital frame image comprised of the digital color pixels, each of which having the corresponding digital luminance value.

Each frame image captured by the image sensor 22 becomes brighter as the exposure time for the corresponding frame image becomes longer, and becomes darker as the exposure time for the corresponding frame image becomes shorter.

Each surrounding monitor camera 4 can be designed to be similar to the front monitor camera 2, and capture frame images in the same manner as the front monitor camera 2.

For example, the controller 26 is configured to instruct the shutter mechanism 22a to control the shutter time to accordingly cause the image sensor 22 to capture subsequent two images, one of which is captured during a shorter value of the shutter time and the other of which is captured during a longer value of the shutter time. One of the subsequent frame images whose shutter time is set to the shorter value will be referred to as a short-shutter image and the other of the subsequent frame images whose shutter time is set to the longer value will be referred to as a long-shutter image.

The composite-image generator 23c is configured to combine the short-shutter image, i.e., short-shutter digital frame image, and the long-shutter image, i.e., the long-shutter digital frame image, with one another to accordingly generate a well-known high-dynamic range (HDR) composite image having a wider dynamic range. The composite-image generator 23c is configured to output the HDR composite image to the control unit 3.

The control unit 3 is comprised of, for example, at least one microcomputer essentially including a processor 3a, such as a CPU, and a memory unit 3b including one or more non-transitory processor-readable media, such as a ROM, a RAM, and/or a flash memory.

The memory unit 3b stores one or more programs, i.e., program instructions of one or more programs. The processor 3a is communicable with the memory unit 3b, and is configured to execute the one or more programs, i.e., program instructions stored in the memory unit 3b to accordingly implement various functions.

That is, the processor 3a for example functionally includes, as the various functions, a common region identifier 31, a difference calculator 32, and a luminance adjuster 33.

HDR composite images captured by the front monitor camera 2 and frame images captured by the front surrounding-view monitor cameras are configured to be inputted to the control unit 3.

Figure 4:
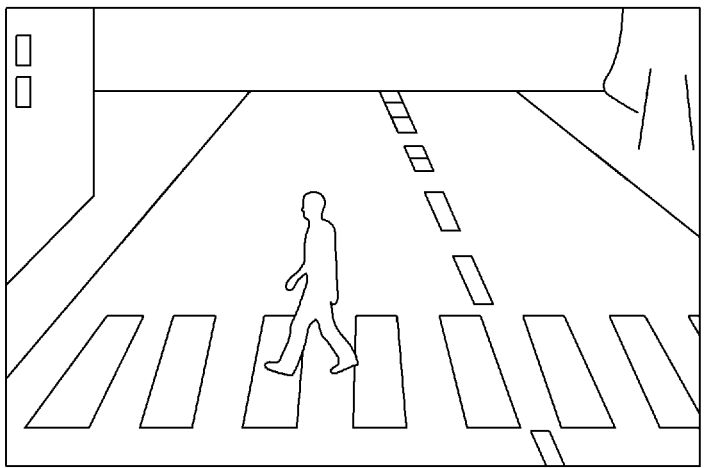
FIG. 4 is a view illustrating an example of a first image.
Figure 5:
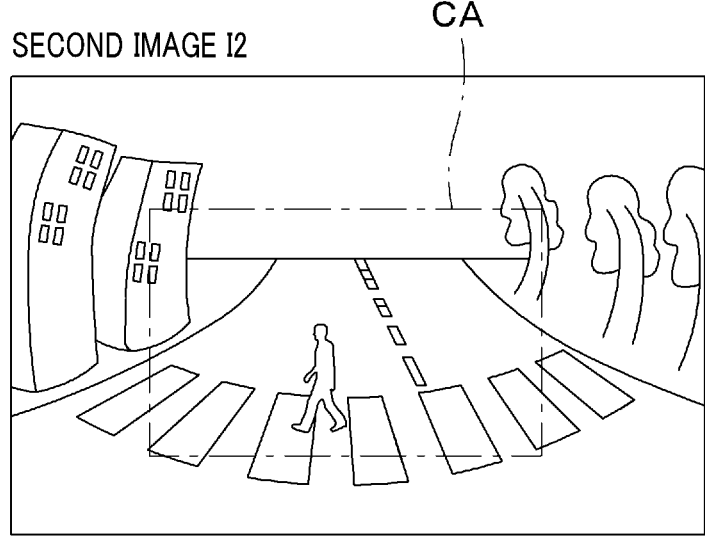
FIG. 5 is a view illustrating an example of a second image.

FIG. 4 schematically illustrates an example of an HDR composite image I1 captured by the front monitor camera 2 at a given time, and FIG. 5 schematically illustrates a frame image I2 captured by the front surrounding-view monitor camera 4 at a time that is the same as the captured time of the HDR composite image illustrated in FIG. 4.

Hereinafter, HDR composite images captured by the front monitor camera 2 will be referred to as first images, and frame images captured by the front surrounding-view monitor camera 4 will be referred to as second images.

Parameters related to each first image, which depend on the specifications of the front monitor camera 2, can be substantially identical to or different from those related to each second image, which depend on the specifications of the front surrounding-view monitor camera 4. These parameters related to an image can include a level of distortion and a level of resolution of the image.

In particular, the main front field of view of the front monitor camera 2 at least partly overlap the additional front field of view of the front surrounding-view monitor camera 4. The overlapped region between the main front field of view of the front monitor camera 2 and the additional front field of view of the front surrounding-view monitor camera 4 enables at least one target object to be captured commonly by both the front monitor camera 2 and the additional front surrounding-view monitor camera 4.

Specifically, the first image I1 and the second image I2 have a common region corresponding to the overlapped region in which at least one target commonly appears. For example, a chain-line rectangle, to which reference character CA is assigned, included in the second image I2 shows the common region between the first image I1 and the second image I2. In the example of FIGS. 4 and 5, the whole of the first image I1 is in common with the whole of the second image I2.

The common region identifier 31 illustrated in FIG. 3 is configured to identify, in each of the first and second images, the common region in accordance with, for example, the location of the overlapped region between the main front field of view of the front monitor camera 2 and the additional front field of view of the front surrounding-view monitor camera 4.

As a first example, when the front monitor camera 2 and the front surrounding-view monitor camera 4 respectively capture a first image and a second image, the common region identifier 31 can perform an image recognition task for each of the first and second images to accordingly identify, in each of the first and second images, the common region in which at least one target commonly appears. As a second example, when an installation of the front monitor camera 2 and the front surrounding-view monitor camera 4 to the vehicle 10 is completed, the common region identifier 31 can identify, in each of the first and second images, the common region in accordance with, for example, information stored in the memory unit 3b; the information represents the location of the overlapped region between the main front field of view of the front monitor camera 2 and the additional front field of view of the front surrounding-view monitor camera 4. As a third example, when maintenance of the front monitor camera 2 and the front surrounding-view monitor camera 4 is completed, the common region identifier 31 can identify, in each of the first and second images, the common region in accordance with, for example, information stored in the memory unit 3b; the information represents the location of the overlapped region between the main front field of view of the front monitor camera 2 and the additional front field of view of the front surrounding-view monitor camera 4.

The luminance adjuster 33 is configured to, when the front monitor camera 2 and the front surrounding-view monitor camera 4 respectively capture a first image and a second image, perform a luminance difference calculation task that calculates a luminance difference between the common region of the first image and the common region of the second image. For example, the luminance difference calculation task calculates a first average of the luminance values of all the pixels of the common region of the first image, and a second average of the luminance values of all the pixels of the common region of the second image. Then, the luminance difference calculation task calculates the difference between the first average and the second average to accordingly calculate the luminance difference between the common region of the first image and the common region of the second image.

In particular, the luminance adjuster 33 is configured to previously perform the luminance difference calculation task in a normal situation, thus calculating the luminance difference between the common region of a reference first image and the common region of a reference second image captured in the normal situation, and storing the calculated luminance difference between the common region of the reference first image and the common region of the reference second image captured in the normal situation in the memory unit 3b as a normal luminance difference.

The normal situation represents a situation around the vehicle 10 satisfies a condition that no flared highlights are likely to appear in the first and second images captured by the respective front monitor camera 2 and the front surrounding-view monitor camera 4. For example, when the amount of solar radiation is smaller than a predetermined threshold level, it can be determined that the condition is satisfied. As another example, when the external light source L2 is not located diagonally above in front of the vehicle 10, it can be determined that the condition is satisfied. For example, the processor 3a can communicate with an external weather information server 50 to accordingly obtain information about the amount of solar radiation and/or the location of the external light source L2.

Why the luminance difference between the common region of the first image and the common region of the second image arises during the normal situation may be due to, for example, (i) the difference between the specifications of the front monitor camera 2 and the specifications of the front surrounding-view monitor camera 4, and/or (ii) the transmission characteristics of the front windshield 5.

That is, the luminance adjuster 33 is configured to previously perform the luminance difference calculation task when the condition is satisfied.

As a first alternative example, when installation of the front monitor camera 2 and the front surrounding-view monitor camera 4 to the vehicle 10 is completed, the luminance adjuster 33 can be configured to perform the luminance difference calculation task thus calculating the luminance difference between the common region of the first image and the common region of the second image, and storing the calculated luminance difference between the common region of the first image and the common region of the second image in the memory unit 3b as the normal luminance difference. This is because, when installation of the front monitor camera 2 and the front surrounding-view monitor camera 4 to the vehicle 10 is completed, the condition set forth above is likely to be satisfied.

As a second alternative example, when maintenance of the front monitor camera 2 and the front surrounding-view monitor camera 4 to the vehicle 10 is completed, the luminance adjuster 33 can be configured to perform the luminance difference calculation task thus calculating the luminance difference between the common region of the first image and the common region of the second image, and storing the calculated luminance difference between the common region of the first image and the common region of the second image in the memory unit 3b as the normal luminance difference. This is because, when maintenance of the front monitor camera 2 and the front surrounding-view monitor camera 4 to the vehicle 10 is completed, the condition set forth above is likely to be satisfied.

After the normal luminance difference is stored in the memory unit 3b, when, for example, the vehicle 10 is traveling, the luminance adjuster 33 is configured to perform the luminance difference calculation task, thus calculating the luminance difference between the common region of the first image and the common region of the second image as a target luminance difference.

Then, the luminance adjuster 33 is configured to determine whether the target luminance difference is different from the normal luminance difference, and adjust the luminance of the first image to accordingly bring the target luminance difference closer to the normal luminance difference in response to determination that the target luminance difference is different from, i.e., greater than, the normal luminance difference.

Specifically, the luminance adjuster 33 is configured to subtract, from the target luminance difference, the normal luminance difference to accordingly calculate a value as the quantity of flared highlights. Then, the luminance adjuster 33 is configured to subtract, from the first image, the quantity of flared highlights to accordingly correct the first image.

Alternatively, in response to determination that the target luminance difference based on the first image captured for a current cycle is different from, i.e., greater than, the normal luminance difference, the luminance adjuster 33 is configured to instruct the controller 26 to perform at least one of an exposure control task, a diaphragm control task, and a gain control task for a first image captured for the next cycle.

Specifically, the exposure control task is configured to instruct the controller 26 to control, through the electronic shutter 22a, the exposure time, i.e., the shutter time or the shutter speed, of selected one or more light-sensitive elements of the image sensor 22 to accordingly bring a target luminance difference calculated based on the first image captured by the front monitor camera 2 for the next cycle closer to the normal luminance difference. Similarly, the diaphragm control task is configured to instruct the controller 26 to control the aperture value of the diaphragm 25 to accordingly bring the target luminance difference calculated based on the first image captured by the front monitor camera 2 for the next cycle closer to the normal luminance difference. Additionally, the gain control task is configured to instruct the controller 26 to control the gain of the amplifier 23a to accordingly bring the target luminance difference calculated based on the first image captured by the front monitor camera 2 for the next cycle closer to the normal luminance difference.

More specifically, the exposure control task is configured to instruct the controller 26 to control, through the electronic shutter 22a, the exposure time, i.e., the shutter time or the shutter speed, of selected one or more light-sensitive elements of the image sensor 22 to accordingly capture the first image for the next cycle from which the quantity of flared highlights has been subtracted. Similarly, the diaphragm control task is configured to instruct the controller 26 to control the aperture value of the diaphragm 25 to accordingly capture the first image for the next cycle from which the quantity of flared highlights has been subtracted. Additionally, the gain control task is configured to instruct the controller 26 to control the gain of the amplifier 23*a* to accordingly capture the first image for the next cycle from which the quantity of flared highlights has been subtracted.

The above configuration of the imaging apparatus 1 makes it possible to cyclically obtain the first images, i.e., the HDR composite images. The control unit 3 outputs, for each cycle, the obtained first image, i.e., the HDR composite image, to an electronic control unit (ECU) 8. The ECU 8 is configured to receive the first images, i.e., the HDR composite images, outputted from the control unit 3, and perform, based on the received HDR composite images, a cruise assist task including, for example, an autonomous drive control task.

Figure 6:
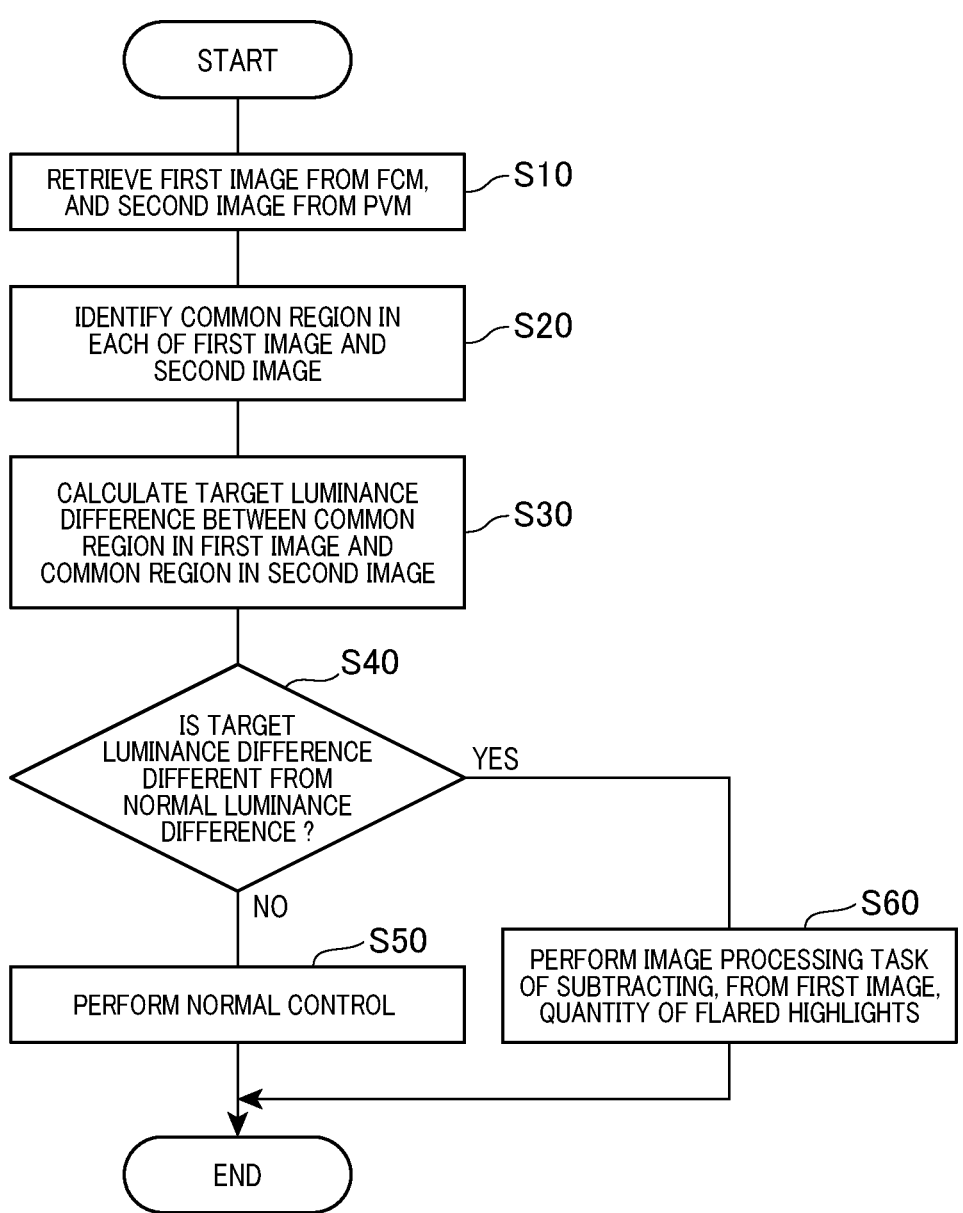
FIG. 6 is a flowchart schematically illustrating an example of a control routine carried out by the imaging apparatus according to the first embodiment.

Next, the following describes an example of a control routine based on the program instructions stored in the memory unit 3*b* with reference to a flowchart of FIG. 6. In the flowchart of FIG. 6, the front monitor camera 2 is represented as FCM, and the front surrounding-view monitor camera 4 is represented as PVM.

Referring to FIG. 6, the processor 3*a* retrieves, from the front monitor camera 2, a first image captured by the front monitor camera 2 for a current cycle, and retrieves, from the front surrounding-view monitor camera 4, a second image captured by the front surrounding-view monitor camera 4 for example in synchronization with the retrieving of the first image in step S10.

Next, the processor 3*a* serves as the common region identifier 31 to identify, in each of the first and second images, a common region in which at least one target commonly appears in accordance with, for example, the location of the overlapped region between the main front field of view of the front monitor camera 2 and the additional front field of view of the front surrounding-view monitor camera 4 in step S20.

Following the operation in step S20, the processor 3*a* serves as the difference calculator 32 to perform the luminance difference calculation task that compares the common region of the first image with the common region of the second image to accordingly calculate, as a target luminance difference, a luminance difference between the common region of the first image and the common region of the second image in step S30.

Next, the processor 3*a* serves as the luminance adjuster 33 to read out the normal luminance difference from the memory unit 3*b*, and determine whether the target luminance difference is different from the normal luminance difference in step S40. In response to determination that the target luminance difference is in agreement with the normal luminance difference (NO in step S40), the processor 3*a* serves as the luminance adjuster 33 to determine that no flared highlights appear in the first image. Then, the control routine proceeds to step S50.

In step S50, the processor 3*a* serves as the luminance adjuster 33 to perform normal control of transmitting the first image captured by the first monitor camera 2 to the ECU 8, and thereafter terminates the control routine.

Otherwise, in response to determination that the target luminance difference is different from the normal luminance difference (YES in step S40), the processor 3*a* serves as the luminance adjuster 33 to determine that flared highlights appear in the first image. Then, the control routine proceeds to step S60.

In step S60, the processor 3*a* serves as the luminance adjuster 33 to perform an image processing task of (I) Subtracting, from the target luminance difference, the normal luminance difference to accordingly calculate a value as the quantity of flared highlights (II) Subtracting, from the first image, the quantity of flared highlights to accordingly correct the first image Then, the processor 3*a* serves as the luminance adjuster 33 to transmit the corrected first image to the ECU 8 in step S60, and thereafter terminates the control routine.

Figure 7:
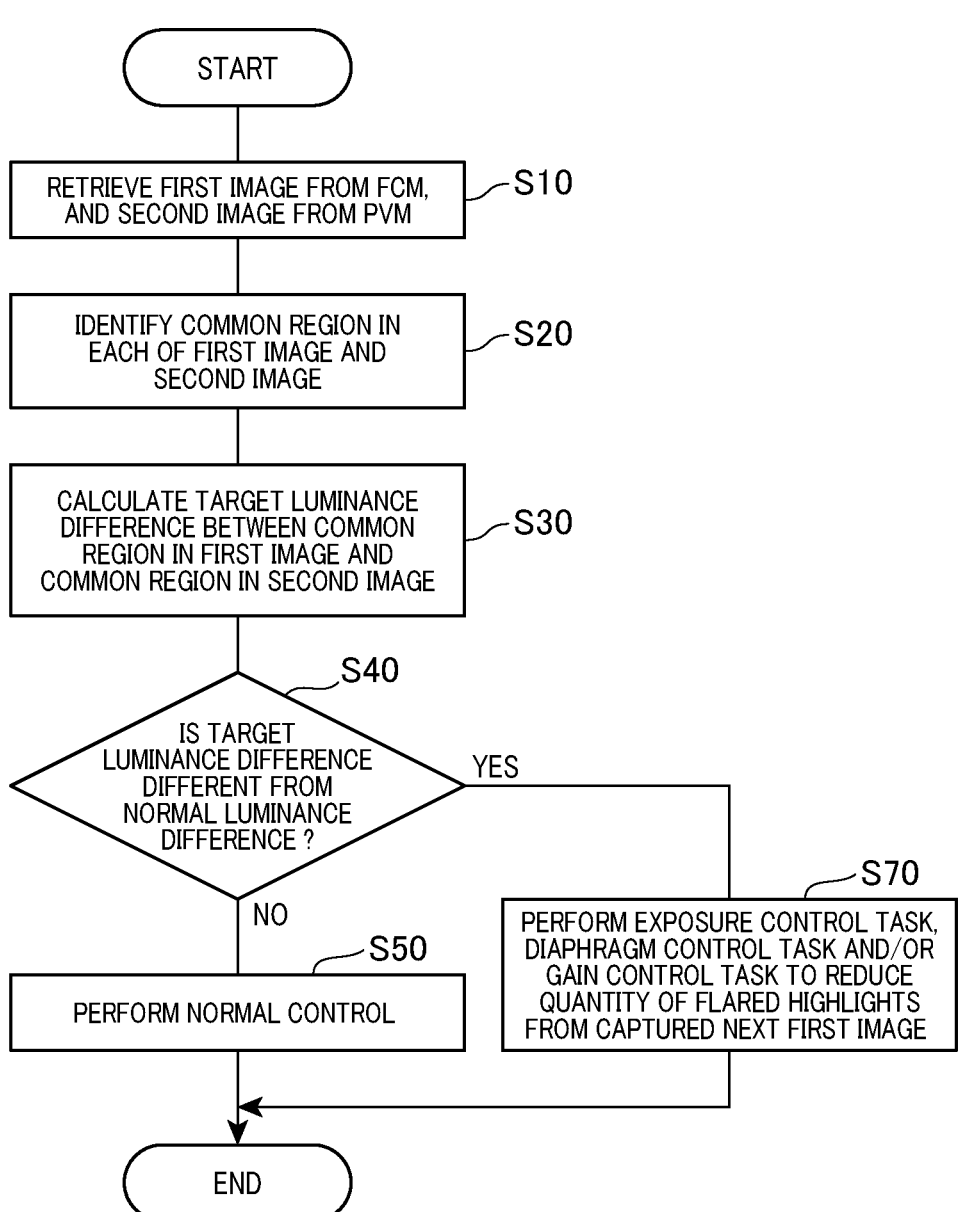
FIG. 7 is a flowchart schematically illustrating an additional example of a control routine carried out by the imaging apparatus according to the first embodiment.

Next, the following describes another example of the control routine based on the program instructions stored in the memory unit 3*b* with reference to a flowchart of FIG. 7.

The operations in steps S10 to S50 illustrated in FIG. 7 are identical to the operations in steps S10 to S50 illustrated in FIG. 6, and therefore, descriptions of the operations in steps S10 to S50 are omitted.

In response to determination that the target luminance difference is different from the normal luminance difference (YES in step S40), the processor 3*a* serves as the luminance adjuster 33 to determine that flared highlights appear in the first image. Then, the control routine proceeds to step S70.

In step S70, the processor 3*a* serves as the luminance adjuster 33 to subtract, from the target luminance difference, the normal luminance difference to accordingly calculate a value as the quantity of flared highlights.

Then, the processor 3*a* serves as the luminance adjuster 33 to perform at least one of the exposure control task, the diaphragm control task, and the gain control task when the front monitor camera 2 captures the first image for the next cycle, thus bringing the target luminance difference calculated based on the first image captured by the front monitor camera 2 for the next cycle closer to the normal luminance difference in step S70. Thereafter, the processor 3*a* serves as the luminance adjuster 33 to transmit the first image captured for the next cycle to the ECU 8 in step S70, and thereafter terminates the control routine.

As described above, the imaging apparatus 1 according to the first embodiment achieves the following advantageous benefits.

The imaging apparatus 1 is configured such that (i) the main front field of view of the front monitor camera 2 includes at least part of the additional front field of view of the front surrounding-view monitor camera 4, and (ii) the front surrounding-view monitor camera 4 is so located outside the compartment of the vehicle 10 as to have no influence from peripheral components, such as the hood 7, an unillustrated dashboard, and the front windshield 5, located around the front monitor camera 2.

Specifically, the control unit 3 of the imaging apparatus 1 having the above configuration calculates, as the target luminance difference, the luminance difference between the common region of the first image captured by the front monitor camera 2 and the common region of the second image captured by the front surrounding-view monitor camera 4. Then, the control unit 3 of the imaging apparatus 1 having the above configuration performs, based on the calculated target luminance difference, the image processing task of correcting the first image, or performs, based on the calculated target luminance difference, at least one of the exposure control task, the diaphragm control task, and the gain control task when the front monitor camera 2 captures the first image for the next cycle Calculating, as the target luminance difference, the luminance difference between the common region of the first image captured by the front monitor camera 2 and the common region of the second image captured by the front surrounding-view monitor camera 4 enables an influence of the peripheral components exerted upon the first image to be determined. Accordingly, performing, based on the calculated target luminance difference, (i) the image processing task of correcting the first image, or (ii) at least one of the exposure control task, the diaphragm control task, and the gain control task when the front monitor camera 2 captures the first image for the next cycle enables the imaging apparatus 1 to obtain the first images having a reduced influence from the peripheral components around the front monitor camera 2.

The control unit 3 of the imaging apparatus 1 stores, as the normal luminance difference, the luminance difference between the common region of the first image and the common region of the second image in the normal situation.

Then, the control unit 3 performs the image processing task of correcting the first image to accordingly bring the target luminance difference closer to the normal luminance difference in response to determination that the target luminance difference is different from the normal luminance difference. Alternatively, the control unit 3 performs at least one of the exposure control task, the diaphragm control task, and the gain control task when the front monitor camera 2 captures the first image for the next cycle to accordingly bring the target luminance difference calculated based on the first image captured by the front monitor camera 2 for the next cycle closer to the normal luminance difference in response to determination that the target luminance difference is different from the normal luminance difference.

This configuration enables determination of whether flared highlights appear in the first image based on determination of whether the target luminance difference is different from the normal luminance difference.

Performing, therefore, correction of the first image to accordingly bring the target luminance difference closer to the normal luminance difference enables the imaging apparatus 1 to obtain the first images having reduced flared highlights.

Alternatively, performing at least one of the exposure control task, the diaphragm control task, and the gain control task when the front monitor camera 2 captures the first image for the next cycle to accordingly bring the target luminance difference calculated based on the first image for the next cycle closer to the normal luminance difference enables the imaging apparatus 1 to obtain the first images having reduced flared highlights.

The control unit 3 of the imaging apparatus 1 subtracts, from the target luminance difference, the normal luminance difference to accordingly calculate a value as the quantity of flared highlights.

Then, the control unit 3 performs the image processing task of correcting the first image based on the actually calculated quantity of flared highlights or performs at least one of the exposure control task, the diaphragm control task, and the gain control task based on the actually calculated quantity of flared highlights. This enables the imaging apparatus 1 to obtain the first images having reduced flared highlights.

Second Embodiment

The following describes the second embodiment of the present disclosure with reference to FIG. 8.

The imaging apparatus 1 according to the second embodiment is substantially identical to the imaging apparatus 1 according to the first embodiment except that a control routine carried out by the processor 3a of the second embodiment is different from the control routine carried out by the processor 3a of the first embodiment. Accordingly, the following describes mainly the control routine carried out by the processor 3a of the second embodiment.

The imaging apparatus 1 of the second embodiment includes, for example, the front monitor camera 2 and the control unit 3, which is similar to the imaging apparatus 1 of the first embodiment illustrated in FIGS. 1 to 3. The hood 7 can be eliminated from the imaging apparatus 1 of the second embodiment.

Like the first embodiment, the front monitor camera 2 of the second embodiment is mounted to, for example, the inner surface of the roof of the vehicle 10 while the lens of the front monitor camera 2 is directed to the front direction of the vehicle 10. That is, the front monitor camera 2 has a predetermined front field of view in front of the vehicle 10, and captures images of the front field of view through the front windshield 5. The front windshield 5 constitutes one of peripheral components located around the front monitor camera 2.

The transmission characteristics, in other words, wavelength-transmission characteristics, of front windshields vary depending from the models and/or grades of vehicles in which the front windshields are installed. If, however, the transmission characteristics of the front windshield 5 are not inputted to the control unit 3 of the imaging apparatus 1 at the time of installation of the imaging apparatus 1 to the vehicle 10, first images subjected to an influence of the transmission characteristics may be transmitted from the imaging apparatus 1 to the ECU 8. This may make it difficult for the ECU 8 to perform recognition of the first images accurately. For example, when the ECU 8 performs recognition of a first image transmitted from the imaging apparatus 1 to accordingly recognize the taillights of a forward vehicle traveling in front of the vehicle 10, it may be difficult for the ECU 8 to accurately identify, in the first image subjected to the transmission characteristics of the front windshield 5, pixels having red luminance information.

The imaging apparatus 1 can include an auto white balance function of setting the proper balance of primary colors (red-green-blue) of each of the first images captured by the front monitor camera. When performing recognition of a first image transmitted from the imaging apparatus 1 to accordingly recognize the taillights of a forward vehicle traveling in front of the vehicle 10, the ECU 8 needs to recognize pixels having red luminance information from the non-corrected first images captured by the front monitor camera 2. For this reason, the auto white balance function may be not very effective for recognition of pixels having red luminance information from the non-corrected first images captured by the front monitor camera 2.

From this viewpoint, the imaging apparatus 1 of the second embodiment aims to obtain images having a reduced influence from the transmission characteristics of the front windshield 5.

Next, the following describes an example of the control routine according to the second embodiment based on the program instructions stored in the memory unit 3b with reference to a flowchart of FIG. 8.

Referring to FIG. 8, the processor 3a retrieves, from the front monitor camera 2, a first image captured by the front monitor camera 2 for a current cycle, and retrieves, from the front surrounding-view monitor camera 4, a second image captured by the front surrounding-view monitor camera 4 for example in synchronization with the retrieving of the first image in step S110.

Next, the processor 3a serves as the common region identifier 31 to identify, in each of the first and second images, a common region in which at least one target commonly appears in accordance with, for example, the location of the overlapped region between the main front field of view of the front monitor camera 2 and the additional front field of view of the front surrounding-view monitor camera 4 in step S120.

Following the operation in step S120, the processor 3a serves as the difference calculator 32 to perform a luminance difference calculation task that compares the common region of the first image with the common region of the second image to accordingly calculate, for each of the predetermined colors, i.e., for each RGB (red, green, and blue), a luminance difference between the common region of the first image and the common region of the second image in step S130.

For example, the luminance difference calculation task calculates a first red average of the red luminance values of the corresponding pixels of the common region of the first image, and calculates a second red average of the red luminance values of the corresponding pixels of the common region of the second image. Then, the luminance difference calculation task calculates the difference between the first red average and the second red average to accordingly calculate a red luminance difference between the common region of the first image and the common region of the second image.

Similarly, the luminance difference calculation task calculates a first green average of the green luminance values of the corresponding pixels of the common region of the first image, and calculates a second green average of the green luminance values of the corresponding pixels of the common region of the second image. Then, the luminance difference calculation task calculates the difference between the first green average and the second green average to accordingly calculate a green luminance difference between the common region of the first image and the common region of the second image.

Additionally, the luminance difference calculation task calculates a first blue average of the blue luminance values of the corresponding pixels of the common region of the first image, and calculates a second blue average of the blue luminance values of the corresponding pixels of the common region of the second image. Then, the luminance difference calculation task calculates the difference between the first blue average and the second blue average to accordingly calculate a blue luminance difference between the common region of the first image and the common region of the second image.

Next, the processor 3a serves as the luminance adjuster 33 to perform an image processing task of adjusting, based on the luminance difference for each of the predetermined colors, i.e., for each RGB (red, green, and blue), the color luminance value of the corresponding color pixel of the first image in step S140, and thereafter terminates the control routine.

This configuration makes it possible to obtain a corrected first image having a reduced influence of the transmission characteristics of the front windshield 5.

After correction of the first image, the processor 3a serves as the luminance adjuster 33 to transmit the corrected first image to the ECU 8 in step S140, and thereafter terminates the control routine.

As described above, the imaging apparatus 1 according to the second embodiment achieves the following advantageous benefits.

The difference calculator 32 according to the second embodiment is configured to calculate, for each of the predetermined colors, i.e., for each RGB (red, green, and blue), the luminance difference between the common region of the first image and the common region of the second image.

Then, the luminance adjuster 33 is configured to adjust, based on the luminance difference for each of the predetermined colors, i.e., for each RGB (red, green, and blue), the color luminance value of the corresponding color pixel of the first image.

That is, the first images captured by the front monitor camera 2 may be subjected to an influence of the transmission characteristics of the front windshield 5 whereas the second images captured by the front surrounding-view monitor camera 4 may be free from the influence of the transmission characteristics of the front windshield 5.

In view of this point, calculating, for each of the predetermined colors, i.e., for each RGB (red, green, and blue), the luminance difference between the common region of the first image and the common region of the second image makes it possible to determine an influence of the transmission characteristics of the front windshield 5 exerted upon the first image, that is, determine the transmission characteristics of the front windshield 5. Accordingly, adjusting, based on the luminance difference for each of the predetermined colors, i.e., for each RGB (red, green, and blue), the color luminance value of the corresponding color pixel of the first image enables the ECU 8 to perform recognition of the first image transmitted from the imaging apparatus 1 with higher accuracy. For example, when recognizing the taillights of a forward vehicle traveling in front of the vehicle 10, the ECU 8 accurately identifies, in the first image, pixels having the red luminance values.

Third Embodiment

Figure 9:
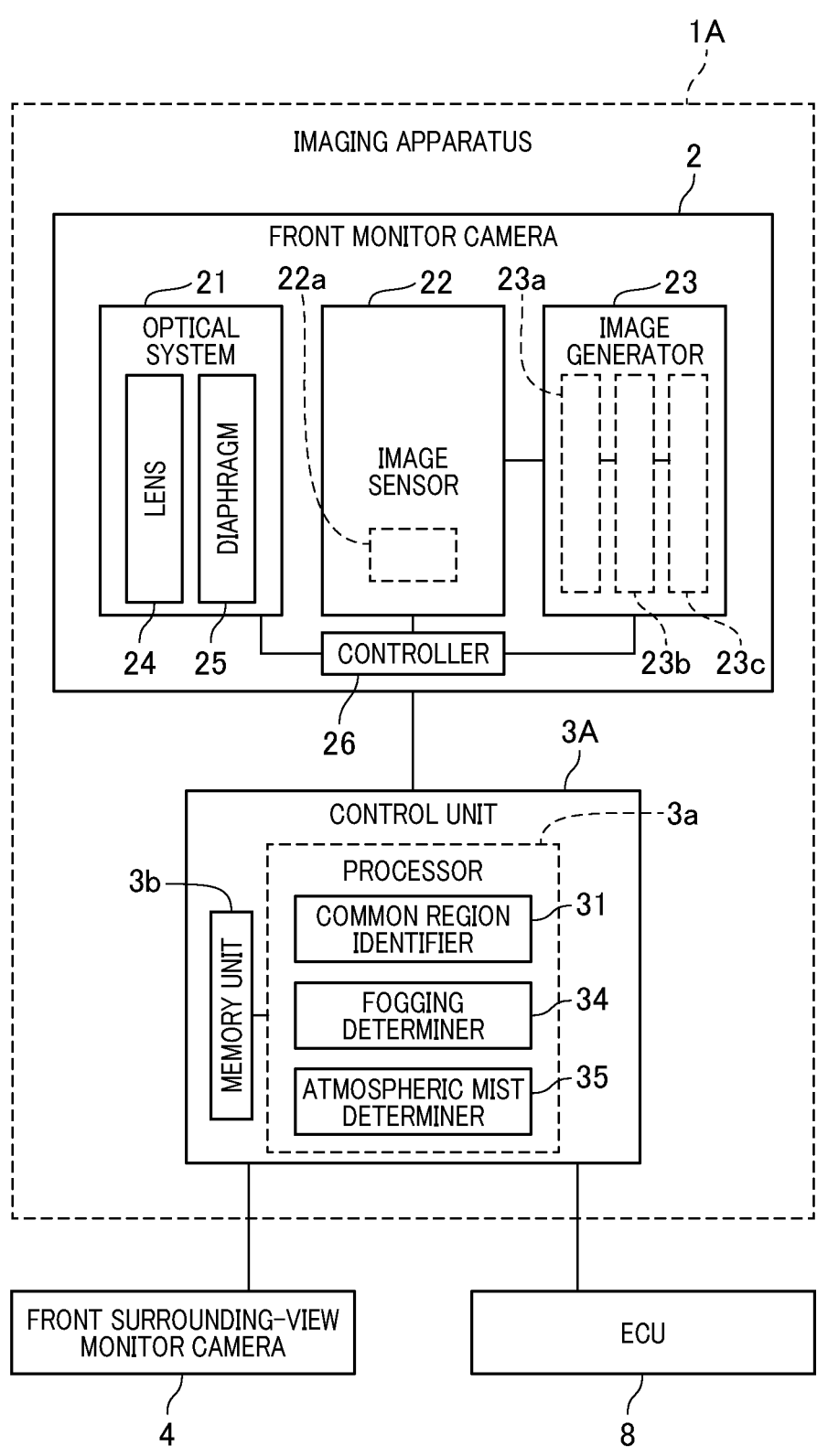
FIG. 9 is a block diagram schematically illustrating an example of a circuit and/or functional structure of an imaging apparatus according to the third embodiment.
Figure 10:
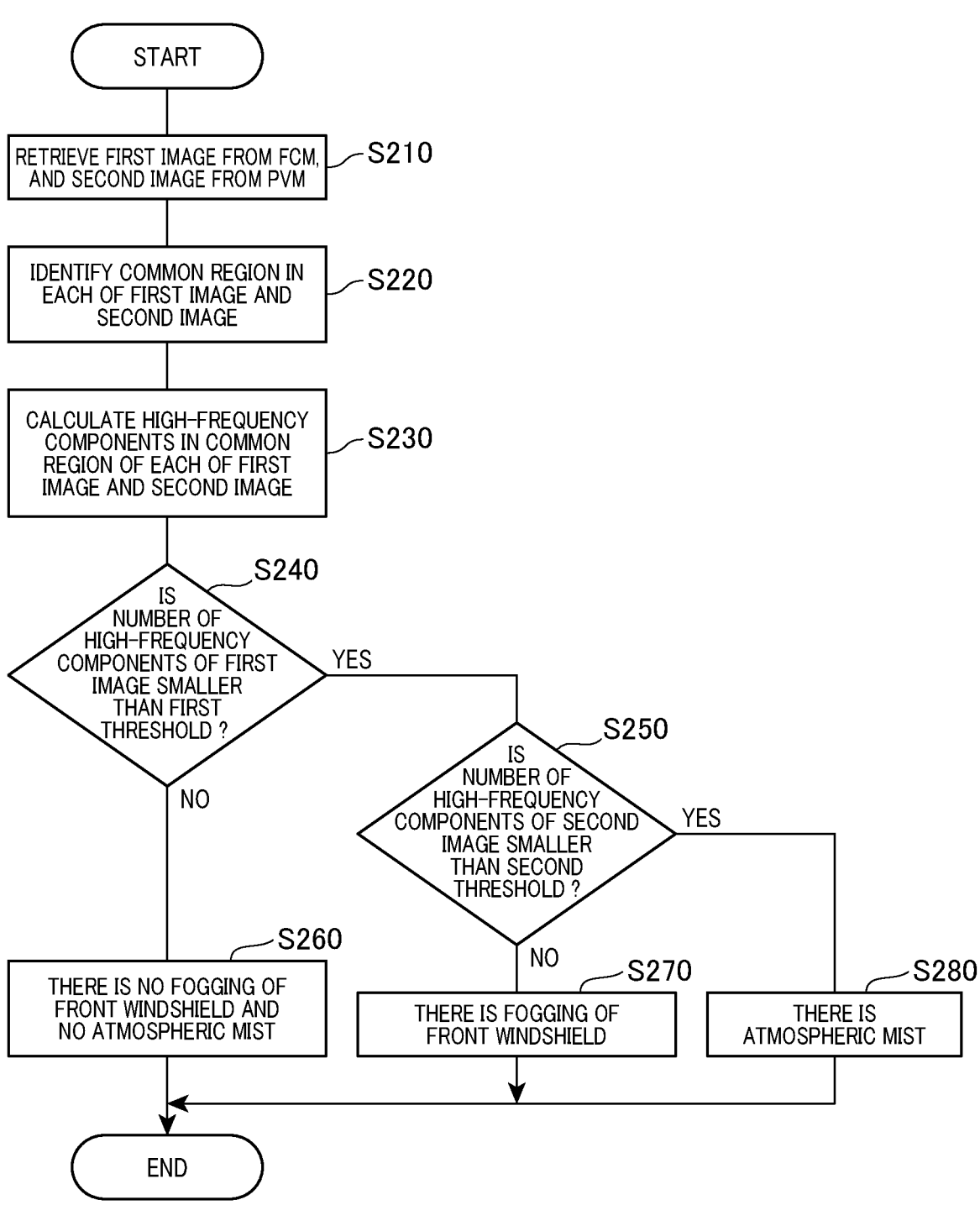
FIG. 10 is a flowchart schematically illustrating an example of a control routine carried out by an imaging apparatus according to the third embodiment.

The following describes the third embodiment of the present disclosure with reference to FIGS. 9 and 10.

Blurring or bokeh of a first image captured by the front monitor camera 2 may make it difficult for the imaging apparatus 1 of the first embodiment to identify whether fogging of the front windshield 5 causes the blurring or atmospheric mist around the vehicle 10 causes the blurring. Blurring of an image may include a blurred outline of at least one object appearing in the image, and/or reduced luminance edges in the image.

Unknown cause of such blurring of a first image captured by the front monitor camera 2 may make it difficult for the ECU 8 or a driver of the vehicle 10 to select a proper addressing of the blurring of the first image received from the front monitor camera 2. This may result in an adverse effect on safety drive of the vehicle 10.

From this viewpoint, an imaging apparatus 1A of the third embodiment aims to determine whether there is fogging of the front windshield 5 or atmospheric mist around the vehicle 10.

The imaging apparatus 1A of the third embodiment includes, for example, the front monitor camera 2 and a control unit 3A, which is similar to the imaging apparatus 1 of the first embodiment illustrated in FIGS. 1 to 3. The hood 7 can be eliminated from the imaging apparatus 1 of the third embodiment.

Like the first embodiment, the front monitor camera 2 of the third embodiment is mounted to, for example, the inner surface of the roof of the vehicle 10 while the lens of the front monitor camera 2 is directed to the front direction of the vehicle 10. That is, the front monitor camera 2 has a predetermined front field of view in front of the vehicle 10, and captures images of the front field of view through the front windshield 5. The front windshield 5 constitutes one of peripheral components located around the front monitor camera 2.

The control unit 3A is comprised of, for example, at least one microcomputer essentially including a processor 3a, such as a CPU, and a memory unit 3b including one or more non-transitory processor-readable media, such as a ROM, a RAM, and/or a flash memory.

The memory unit 3b stores one or more programs, i.e., program instructions of one or more programs. The processor 3a is communicable with the memory unit 3b, and is configured to execute the one or more programs, i.e., program instructions stored in the memory unit 3b to accordingly implement various functions.

That is, the processor 3a for example functionally includes, as the various functions, a common region identifier 31, which is similar to the common region identifier 31 of the first embodiment, a fogging determiner 34, and an atmospheric mist determiner 35.

Like the first embodiment, the common region identifier 31 is configured to identify, in each of the first and second images, the common region in accordance with, for example, the location of the overlapped region between the main front field of view of the front monitor camera 2 and the additional front field of view of the front surrounding-view monitor camera 4.

The fogging determiner 34 is configured to determine whether there is fogging of the front windshield 5. Specifically, the first images captured by the front monitor camera 2 may be subjected to an influence of fogging of the front windshield 5 whereas the second images captured by the front surrounding-view monitor camera 4 may be free from the influence of fogging of the front windshield 5.

From this viewpoint, the fogging determiner 34 is configured to determine whether (i) the amount of blurring (bokeh) in the common region of the first image is greater than a predetermined first determination criterion and (ii) the amount of blurring (bokeh) in the common region of the second image is smaller than or equal to a predetermined second determination criterion.

Then, the fogging determiner 34 is configured to determine that there is fogging of the front windshield 5 in response to determination that (i) the amount of blurring in the common region of the first image is greater than the predetermined first determination criterion and (ii) the amount of blurring in the common region of the second image is smaller than or equal to the predetermined second determination criterion.

The first determination criterion was previously determined by, for example, simulation and/or experiment, which enables the amount of blurring in the common region of the first image due to fogging of the front windshield 5 to be determined. The memory unit 3b stores the previously determined first determination criterion. The second determination criterion was previously determined by, for example, simulation and/or experiment, which enables the amount of blurring in the common region of the first image due to atmospheric mist around the vehicle 10 to be determined. The memory unit 3b stores the previously determined second determination criterion.

The amount of blurring (bokeh) in an image can be determined based on the ratio of high-frequency spectrums, i.e., high-frequency components, in all the frequency spectrums, i.e., all the high-frequency components, converted from light and dark patterns based on the luminance values of the image. That is, high-frequency components correspond to short-period light and dark patterns in the first image.

Specifically, the greater the high-frequency components in the first image represents the smaller the amount of blurring in the first image, and the smaller the high-frequency components in the first image represents the greater the amount of blurring in the first image.

From this viewpoint, the fogging determiner 34 is configured to convert the light and dark patterns based on the luminance values included in the common region of each of the first and second images into frequency spectrums, i.e., frequency components, using, for example, known frequency analysis, such as first Fourier transform, thus extracting frequency spectrums, i.e., frequency components, higher than a predetermined threshold from the frequency spectrums, i.e., frequency components, in the common image of each of the first and second images.

Then, the fogging determiner 34 is configured to determine whether (i) the number of the extracted high-frequency components in the common region of the first image is smaller than a predetermined first threshold and the number of the extracted high-frequency components in the common region of the second image is greater than or equal to a predetermined second threshold. Then, the fogging determiner 34 is configured to determine that there is fogging of the front windshield 5 in response to determination that (i) the number of the extracted high-frequency components in the common region of the first image is smaller than the predetermined first threshold and the number of the extracted high-frequency components in the common region of the second image is greater than or equal to the predetermined second threshold.

The first threshold was previously determined by, for example, simulation and/or experiment, which enables the amount of blurring in the common region of the first image due to fogging of the front windshield 5 to be determined. The memory unit 3b stores the previously determined first threshold. The second threshold was previously determined by, for example, simulation and/or experiment, which enables the amount of blurring in the common region of the first image due to atmospheric mist around the vehicle 10 to be determined. The memory unit 3b stores the previously determined second threshold.

The atmospheric mist determiner 35 is configured to determine whether there is atmospheric mist around the vehicle 10. Specifically, both the first images captured by the front monitor camera 2 and the second images captured by the front surrounding-view monitor camera 4 may be subjected to an influence of atmospheric mist around the vehicle 10.

From this viewpoint, the atmospheric mist determiner 35 is configured to determine whether (i) the amount of blurring in the common region of the first image is greater than the first determination criterion and (ii) the amount of blurring in the common region of the second image is greater than the second determination criterion.

Then, the atmospheric mist determiner 35 is configured to determine that there is atmospheric mist around the vehicle 10 in response to determination that (i) the amount of blurring in the common region of the first image is greater than the first determination criterion and (ii) the amount of blurring in the common region of the second image is greater than the second determination criterion.

Specifically, the atmospheric mist determiner 35 is configured to determine whether (i) the number of the extracted high-frequency components in the common region of the first image is smaller than the first threshold and the number of the extracted high-frequency components in the common region of the second image is smaller than the second threshold. Then, the atmospheric mist determiner 35 is configured to determine that there is atmospheric mist around the vehicle 10 in response to determination that (i) the number of the extracted high-frequency components in the common region of the first image is smaller than the first threshold and the number of the extracted high-frequency components in the common region of the second image is smaller than the second threshold.

The fogging determiner 34 is additionally configured to transmit, to the ECU 8, a result of determination of whether there is fogging of the front windshield 5. Similarly, the atmospheric mist determiner 35 is additionally configured to transmit, to the ECU 8, a result of determination of whether there is atmospheric mist around the vehicle 10.

The ECU 8 is configured to cause one or more displays and/or one or more lamps installed in the compartment of the vehicle 10 to visibly notify one or more occupants in the vehicle 10 of the result of the determination transmitted from the fogging determiner 34 and/or cause one or more speakers installed in the compartment of the vehicle 10 to audibly notify the one or more occupants of the result of the determination transmitted from the fogging determiner 34.

Similarly, the ECU 8 is configured to cause the one or more displays and/or the one or more lamps installed in the compartment of the vehicle 10 to visibly notify the one or more occupants in the vehicle 10 of the result of the determination transmitted from the atmospheric mist determiner 35 and/or cause the one or more speakers installed in the compartment of the vehicle 10 to audibly notify the one or more occupants of the result of the determination transmitted from the atmospheric mist determiner 35.

Upon receiving the result of the determination transmitted from the fogging determiner 34, the one or more occupants can perform a proper addressing of, for example, turning on a defroster for the front windshield 5 in accordance with the situation defined based on the result of the determination transmitted from the fogging determiner 34. Upon receiving the result of the determination transmitted from the atmospheric mist determiner 35, the one or more occupants can perform a proper addressing of, for example, switching the headlights of the vehicle 10 to the high beams in accordance with the situation defined based on the result of the determination transmitted from the atmospheric mist determiner 35.

Next, the following describes an example of a control routine according to the third embodiment based on the program instructions stored in the memory unit 3b with reference to a flowchart of FIG. 10.

Referring to FIG. 10, the processor 3a retrieves, from the front monitor camera 2, a first image captured by the front monitor camera 2 for a current cycle, and retrieves, from the front surrounding-view monitor camera 4, a second image captured by the front surrounding-view monitor camera 4 for example in synchronization with the retrieving of the first image in step S210.

Next, the processor 3a serves as the common region identifier 31 to identify, in each of the first and second images, a common region in which at least one target commonly appears in accordance with, for example, the location of the overlapped region between the main front field of view of the front monitor camera 2 and the additional front field of view of the front surrounding-view monitor camera 4 in step S220.

Following the operation in step S220, the processor 3a serves as the fogging determiner 34 to convert light and dark patterns based on the luminance values included in the common region of each of the first and second images into frequency spectrums, i.e., frequency components, using, for example, known frequency analysis, such as first Fourier transform. Then, the processor 3a serves as the fogging determiner 34 to extract frequency spectrums, i.e., frequency components, higher than the predetermined threshold from the frequency spectrums, i.e., frequency components, in the common image of each of the first and second images in step S230.

Following the operation in step S230, the processor 3a serves as the fogging determiner 34 to determine whether the number of the extracted high-frequency components in the common region of the first image is smaller than the predetermined first threshold in step S240.

In response to determination that the number of the extracted high-frequency components in the common region of the first image is greater than or equal to the predetermined first threshold (NO in step S240), the control routine proceeds to step S260. In other words, in response to determination that the amount of blurring in the common region of the first image is smaller than or equal to the first determination criterion, the control routine proceeds to step S260.

In step S260, the processor 3a serves as the fogging determiner 34 to determine that there is no fogging of the front windshield 5, and serves as the atmospheric mist determiner 35 to determine that there is no mist atmosphere around the vehicle 10. Next, the processor 3a serves as each of the fogging determiner 34 and the atmospheric mist determiner 35 to transmit the corresponding determination result to the ECU 8 in step S260.

Otherwise, in response to determination that the number of the extracted high-frequency components in the common region of the first image is smaller than the predetermined first threshold (YES in step S240), the control routine proceeds to step S250. In other words, in response to determination that the amount of blurring in the common region of the first image is greater than the first determination criterion, the control routine proceeds to step S250.

In step S250, the processor 3a serves as each of the fogging determiner 34 and the atmospheric mist determiner 35 to determine whether the number of the extracted high-frequency components in the common region of the second image is greater than the predetermined second threshold.

In response to determination that the number of the extracted high-frequency components in the common region of the second image is greater than or equal to the predetermined second threshold (NO in step S250), the control routine proceeds to step S270. In other words, in response to determination that the amount of blurring in the common region of the second image is smaller than or equal to the second determination criterion, the control routine proceeds to step S270.

In step S270, the processor 3a serves as the fogging determiner 34 to determine that there is fogging of the front windshield 5. Then, the processor 3a serves as the fogging determiner 34 to transmit the corresponding determination result to the ECU 8 in step S270.

In contrast, in response to determination that the number of the extracted high-frequency components in the common region of the second image is smaller than the predetermined second threshold (YES in step S250), the control routine proceeds to step S280. In other words, in response to determination that the amount of blurring in the common region of the second image is greater than the second determination criterion, the control routine proceeds to step S280.

In step S280, the processor 3a serves as the atmospheric mist determiner 35 to determine that there is a mist atmosphere around the vehicle 10. Then, the processor 3a serves as the atmospheric mist determiner 35 to transmit the corresponding determination result to the ECU 8 in step S280.

When any one of the operations in steps S260, S270, and S280 is completed, the processor 3a terminates the control routine.

As described above, the imaging apparatus 1A according to the third embodiment achieves the following advantageous benefits.

The fogging determiner 34 of the imaging apparatus 1A according to the third embodiment is configured to determine whether (i) the amount of blurring (bokeh) in the common region of the first image is greater than or equal to the predetermined first determination criterion and (ii) the amount of blurring (bokeh) in the common region of the second image is smaller than or equal to the predetermined second determination criterion.

Then, the fogging determiner 34 is configured to determine that there is fogging of the front windshield 5 in response to determination that the amount of blurring in the common region of the first image is greater than or equal to the predetermined first determination criterion and the amount of blurring in the common region of the second image is smaller than or equal to the predetermined second determination criterion.

That is, the first images captured by the front monitor camera 2 may be subjected to an influence of fogging of the front windshield 5 whereas the second images captured by the front surrounding-view monitor camera 4 may be free from the influence of the fogging of the front windshield 5.

In view of this point, determining that the amount of blurring in the common region of the first image is greater than the predetermined first determination criterion and the amount of blurring in the common region of the second image is smaller than or equal to the predetermined second determination criterion makes it possible to determine that there is fogging of the front windshield 5.

The fogging determiner 34 is configured to determine whether (i) the number of the extracted high-frequency components in the common region of the first image is smaller than the predetermined first threshold and (ii) the number of the extracted high-frequency components in the common region of the second image is greater than the predetermined second threshold.

Then, the fogging determiner 34 is configured to determine that there is fogging of the front windshield 5 in response to determination that (i) the number of the extracted high-frequency components in the common region of the first image is smaller than the predetermined first threshold and (ii) the number of the extracted high-frequency components in the common region of the second image is greater than or equal to the predetermined second threshold.

The smaller the high-frequency components in the common region of the first image represents the greater the amount of blurring in the first image, and the greater the high-frequency components in the common region of the second image represents the smaller the amount of blurring in the second image.

From this viewpoint, determining that (i) the number of the extracted high-frequency components in the common region of the first image is smaller than the predetermined first threshold and (ii) the number of the extracted high-frequency components in the common region of the second image is greater than or equal to the predetermined second threshold makes it possible to determine that there is fogging of the front windshield 5.

The atmospheric mist determiner 35 of the imaging apparatus 1A according to the third embodiment is configured to determine whether (i) the amount of blurring in the common region of the first image is greater than or equal to the predetermined first determination criterion and (ii) the amount of blurring in the common region of the second image is greater than the predetermined second determination criterion.

Then, the fogging determiner 34 is configured to determine that there is a mist atmosphere around the vehicle 10 in response to determination that the amount of blurring in the common region of the first image is greater than or equal to the predetermined first determination criterion and the amount of blurring in the common region of the second image is greater than the predetermined second determination criterion.

That is, determining that the amount of blurring in the common region of the first image is greater than or equal to the predetermined first determination criterion and the amount of blurring in the common region of the second image is greater than the predetermined second determination criterion makes it possible to determine that there is a mist atmosphere around the vehicle 10.

The atmospheric mist determiner 35 is configured to determine whether (i) the number of the extracted high-frequency components in the common region of the first image is smaller than the predetermined first threshold and (ii) the number of the extracted high-frequency components in the common region of the second image is greater than or equal to the predetermined second threshold.

Then, the atmospheric mist determiner 35 is configured to determine that there is a mist atmosphere around the vehicle 10 in response to determination that (i) the number of the extracted high-frequency components in the common region of the first image is smaller than the predetermined first threshold and (ii) the number of the extracted high-frequency components in the common region of the second image is smaller than the predetermined second threshold.

Determining that (i) the number of the extracted high-frequency components in the common region of the first image is smaller than the predetermined first threshold and (ii) the number of the extracted high-frequency components in the common region of the second image is smaller than the predetermined second threshold makes it possible to determine that there is a mist atmosphere around the vehicle 10.

Modifications

The front monitor camera 2 and the control unit 3 included in the imaging apparatus 1, 1A according to each of the first to third embodiments are separately arranged from one another, but the control unit 3 can be integrally installed in the front monitor camera 2 as an imaging apparatus.

The control unit 3 of the imaging apparatus 1, 1A and the ECU 8 of the vehicle 10 according to each of the first to third embodiments are separately arranged from one another, but some or all of the functions of the control unit 3 can be integrally installed in the ECU 8 of the vehicle 10.

The ECU 8 according to the second embodiment is configured to recognize the taillights of a forward vehicle traveling in front of the vehicle 10 as an example of image processing operations executable by the ECU 8, but the present disclosure is not limited thereto. Specifically, the ECU 8 can be configured to recognize the traffic signals and/or traffic signs as an example of the image processing operations executable thereby.

The imaging apparatus 1A of the third embodiment is configured to determine that the amount of blurring in the common region of each of the first and second images is greater than the corresponding determination criterion in response to determination that the high-frequency components in the common region of the corresponding one of the first and second images is smaller than the corresponding threshold, but the present disclosure is not limited thereto.

Specifically, the imaging apparatus 1A of the present disclosure can be configured to determine that the amount of blurring in the common region of each of the first and second images is greater than the corresponding determination criterion in response to determination that low-frequency components in the common region of the corresponding one of the first and second images is greater than a corresponding threshold. That is, the imaging apparatus 1A of the present disclosure can be configured to determine that the amount of blurring in the common region of each of the first and second images is greater than the corresponding determination criterion using any one of known various methods including deep leaning.

Each of the fogging determiner 34 and the atmospheric mist determiner 35 is configured to transmit the corresponding determination results to the ECU 8, but can be configured to transmit the corresponding determination results to displays, lamps, and/or speakers installed in the compartment of the vehicle 10.

While the illustrative exemplary embodiments of the present disclosure have been described herein, the present disclosure is not limited to the exemplary embodiment and its configuration described herein. Specifically, the present disclosure includes various modifications and/or alternatives within the scope of the present disclosure. In addition to various combinations and forms, other combinations and forms including one or more/less elements thereof are also within the inventive principle and scope of the present disclosure.

One or more components in each of the exemplary embodiments are not necessarily essential components except for (i) one or more components that are described as one or more essential components or (ii) one or more components that are essential in principle.

Specific values disclosed in each of the exemplary embodiments, each of which represents the number of components, a physical quantity, and/or a range of a physical parameter, are not limited thereto except that (i) the specific values are obviously essential or (ii) the specific values are essential in principle.

The specific function or configuration of each component described in each of the exemplary embodiments is not limited thereto except for cases in which (1) the specific function or configuration is described to be essential or (2) the specific function or configuration is required in principle. Similarly, the specific structural or functional relationship between components described in each of the exemplary embodiments is not limited thereto except for cases in which (1) the specific structural or functional relationship is described to be essential or (2) the specific structural or functional relationship is required in principle.

The processors or control units and their control methods executable by the processors or control units in the present disclosure can be implemented by a dedicated computer including a memory and a processor programmed to perform one or more functions embodied by one or more computer programs.

The processors or control units and their control methods executable by the processors or control units in the present disclosure can also be implemented by a dedicated computer including a processor comprised of one or more dedicated hardware logic circuits.

The processors or control units and their control methods executable by the processors or control units in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor. One or more functions included in each of the image processing apparatuses disclosed in the present disclosure can be implemented by one or more programmed logic circuits, one or more hardwired logic circuits, and/or one or more hardwired-logic and programmable-logic hybrid circuits.

What is claimed is:

1. An imaging apparatus to be installed in a vehicle including a compartment, a front windshield, and a surrounding monitor camera having a surrounding field of view of the vehicle, the surrounding monitor camera being located outside the compartment of the vehicle, the imaging apparatus comprising:

a front monitor camera having a front field of view for capturing, through the front windshield, a first image of the front field of view using at least one imaging parameter, the front field of view at least partly overlapping the surrounding field of view of the surrounding monitor camera so that an overlapped region between the front field of view and the surrounding field of view is defined as a common region of each of the first image and a second image captured by the surrounding monitor camera;

a common region identifier configured to identify the common region of each of the first and second images;

a difference calculator configured to calculate a target luminance difference between the common region of the first image and the common region of the second image; and a luminance adjuster configured to perform, based on the target luminance difference, at least one of (i) a first adjustment of adjusting a luminance of the first image and (ii) a second adjustment of adjusting the at least one imaging parameter of the front monitor camera.

2. The imaging apparatus according to claim 1, wherein:

the front monitor camera is configured to:

capture, based on an amount of incoming light adjusted by an aperture value of a diaphragm, the first image of the front field of view during an exposure time; and amplify a luminance value of the captured first image by a gain; and the luminance adjuster is configured to adjust, as the at least one imaging parameter, at least one of the exposure time, the aperture value, and the gain.

3. The imaging apparatus according to claim 1, wherein:

the front monitor camera includes a hood arranged below the front monitor camera in a height direction of the vehicle to block light from entering the front monitor camera from an inside of the compartment;

each of the front monitor camera and the surrounding monitor camera is configured to capture a corresponding one of the first image and the second image for a current capturing cycle; and the luminance adjuster is configured to:
   determine whether the target luminance difference is different from a normal luminance difference between the common region of a reference first image and the common region of a reference second image, the normal reference difference being stored in the imaging apparatus, the reference first image being captured by the front monitor camera during a predetermined normal situation, the reference second image being captured by the surrounding monitor camera during the predetermined normal situation; and the luminance adjuster is configured to perform, in response to determination that the target luminance difference is different from the normal luminance difference, at least one of:
   the first adjustment of adjusting the luminance of the first image to accordingly bring the target luminance difference closer to the normal luminance difference; and
   the second adjustment of adjusting the at least one imaging parameter of the front monitor camera when the front monitor camera captures a next first image for a next capturing cycle to accordingly bring a next luminance difference calculated by the difference calculator between the next first image and a next second image captured by the surrounding monitor camera for the next capturing cycle closer to the normal luminance difference.

4. The imaging apparatus according to claim 3, wherein:
the luminance adjuster is configured to:
   subtract, from the luminance difference between the common region of the first image and the common region of the second image calculated by the difference calculator, the normal luminance difference between the common region of the reference first image and the common region of the reference second image to accordingly calculate a quantity of flared highlights; and
   perform at least one of:
      the first adjustment of subtracting, from the first image, the quantity of flared highlights to accordingly correct the first image; and
      the second adjustment of adjusting the at least one imaging parameter of the front monitor camera to accordingly cause the front monitor camera to capture the next first image for the next cycle from which the quantity of flared highlights has been subtracted.

5. The imaging apparatus according to claim 1, wherein:
each of the first and second images is comprised of color pixels, each of which has a corresponding luminance value of at least one of predetermined colors;
the difference calculator is configured to calculate, as the target luminance difference between the common region of the first image and the common region of the second image, a color luminance difference between the common region of the first image and the common region of the second image for each of the predetermined colors; and the luminance adjuster is configured to adjust, for each color pixel of the first image, the corresponding color luminance value in accordance with the calculated luminance difference between the common region of the first image and the common region of the second image for each of the predetermined colors.

6. An imaging apparatus to be installed in a vehicle including a compartment, a front windshield, and a surrounding monitor camera having a surrounding field of view of the vehicle, the surrounding monitor camera being located outside the compartment of the vehicle, the imaging apparatus comprising:
   a front monitor camera having a front field of view for capturing, through the front windshield, a first image of the front field of view, the front field of view at least partly overlapping the surrounding field of view of the surrounding monitor camera so that an overlapped region between the front field of view and the surrounding field of view is defined as a common region of each of the first image and a second image captured by the surrounding monitor camera;
   a common region identifier configured to identify the common region of each of the first and second images; and
   a fogging determiner configured to:
      determine whether an amount of blurring in the common region of the first image is greater than a predetermined first determination criterion;
      determine whether an amount of blurring in the common region of the second image is smaller than or equal to a predetermined second determination criterion; and
      determine that there is fogging of the front windshield in response to determination that the amount of blurring in the common region of the first image is greater than the predetermined first determination criterion, and the amount of blurring in the common region of the second image is smaller than or equal to the predetermined second determination criterion.

7. The imaging apparatus according to claim 6, wherein:
the fogging determiner is configured to:
   convert light and dark patterns based on luminance values included in the common region of each of the first and second images into frequency components;
   extract, from the frequency components in the common region of each of the first and second images, high-frequency components higher than a predetermined threshold,
the high-frequency components in the common region of the first image being a first parameter related to the amount of blurring in the common region of the first image, the high-frequency components in the common region of the second image being a second parameter related to the amount of blurring in the common region of the second image;
   determine whether the number of the high-frequency components in the common region of the first image is smaller than a predetermined first threshold;
   determine whether the number of the high-frequency components in the common region of the second image is greater than or equal to a predetermined second threshold; and
   determine that there is fogging of the front windshield in response to determination that the number of the high-frequency components in the common region of the first image is smaller than the predetermined first threshold, and that the number of the high-frequency components in the common region of the second image is greater than or equal to the predetermined second threshold.

8. The imaging apparatus according to claim 7, further comprising:

an atmospheric mist determiner configured to determine that there is a mist atmosphere around the vehicle in response to determination that the amount of blurring in the common region of the first image is greater than the predetermined first determination criterion, and the amount of blurring in the common region of the second image is greater than the predetermined second determination criterion.

9. The imaging apparatus according to claim 8, wherein:

the atmospheric mist determiner is configured to determine that there is atmospheric mist around the vehicle in response to determination that number of the high-frequency components in the common region of the first image is smaller than the predetermined first threshold, and that the number of the high-frequency components in the common region of the second image is smaller than the predetermined second threshold.

10. The imaging apparatus according to claim 6, further comprising:

an atmospheric mist determiner configured to determine that there is a mist atmosphere around the vehicle in response to determination that the amount of blurring in the common region of the first image is greater than the predetermined first determination criterion, and the amount of blurring in the common region of the second image is greater than the predetermined second determination criterion.

\* \* \* \* \*